(No Model.) 2 Sheets—Sheet 1.

J. B. STONER.
HORSESHOE AND CALK.

No. 472,562. Patented Apr. 12, 1892.

Witnesses.
Robt Smith
J. A. Rutherford.

Inventor.
John B. Stoner.
By James L. Norris.
Atty.

(No Model.) 2 Sheets—Sheet 2.

J. B. STONER.
HORSESHOE AND CALK.

No. 472,562. Patented Apr. 12, 1892.

Witnesses:
Robert Smitt,
J. A. Rutherford.

Inventor:
John B. Stoner,
By James L. Norris.
Atty

UNITED STATES PATENT OFFICE.

JOHN B. STONER, OF NEW YORK, N. Y., ASSIGNOR TO CHARLES B. HILLHOUSE, OF SAME PLACE.

HORSESHOE AND CALK.

SPECIFICATION forming part of Letters Patent No. 472,562, dated April 12, 1892.

Application filed June 23, 1891. Serial No. 397,236. (No model.)

*To all whom it may concern:*

Be it known that I, JOHN B. STONER, a citizen of the United States, residing at New York, in the county of New York and State of New York, have invented new and useful Improvements in Horseshoes and Calks Therefor, of which the following is a specification.

This invention has for its object to provide a novel horseshoe and toe-calk which are simple, economical, and efficient in construction and can be rapidly and conveniently removed and replaced as occasion may demand.

The invention also has for its object to provide a novel construction of horseshoe and toe-calk, whereby these parts are so connected as to effectually resist lateral turning or twisting of the toe-calk.

The invention also has for its object to provide a novel construction of horseshoe and toe and heel calks, whereby the pulling strain on the calks is resisted by inclined bearing-surfaces, and the calks are thereby held against displacement.

To accomplish all these objects my invention involves the features of construction and the combination or arrangement of devices hereinafter described and claimed, reference being made to the accompanying drawings, in which—

Figure 1:
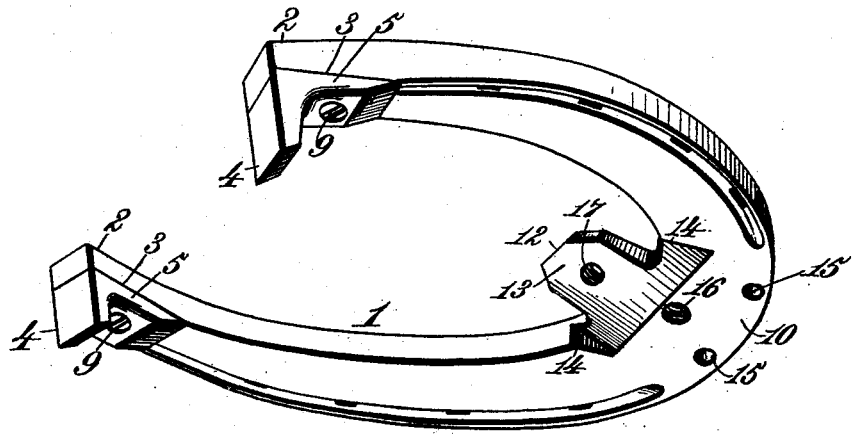
Figure 2:
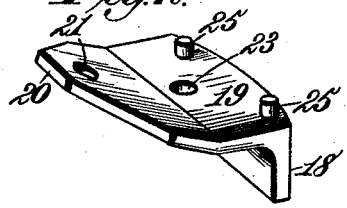
Figure 3:
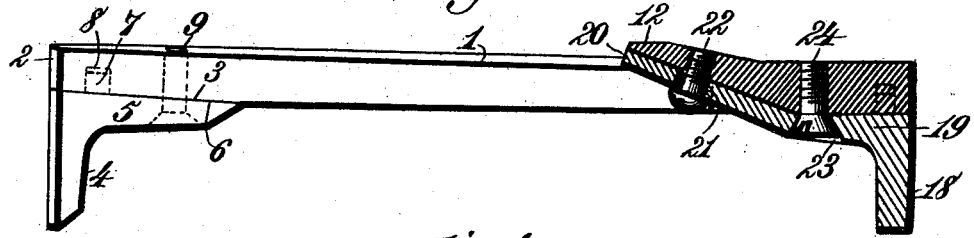
Figure 4:
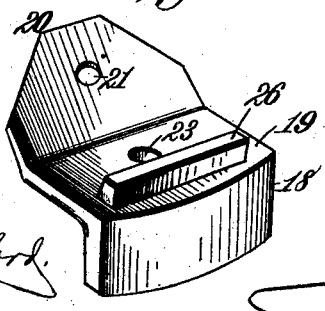
Figure 5:
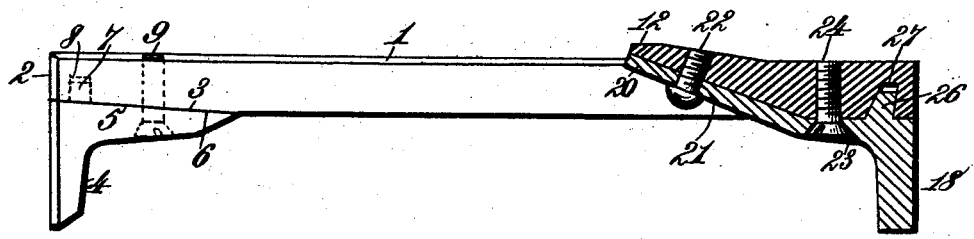
Figure 6:
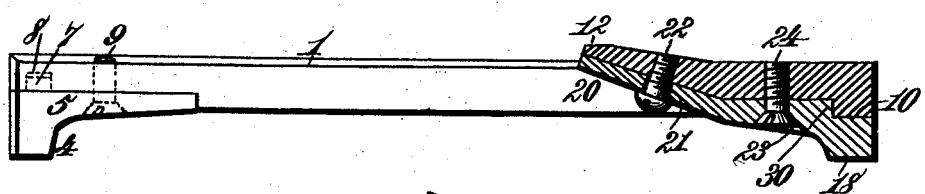
Figure 7:
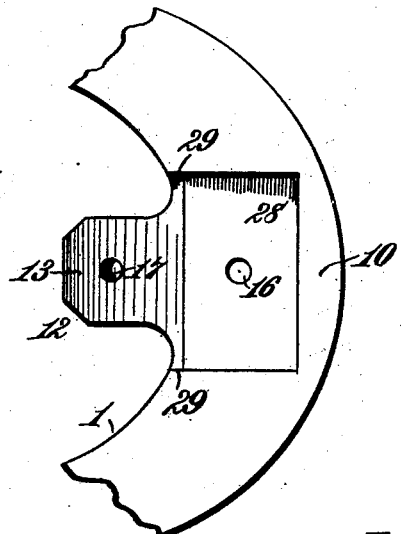

Figure 1 is a perspective view of a horseshoe constructed in accordance with my invention, the toe-calk being detached. Fig. 2 is a detail perspective view of the toe-calk. Fig. 3 is a sectional view showing the toe-calk attached. Fig. 4 is a detail perspective view showing a modified construction of toe-calk. Fig. 5 is a sectional view of a horseshoe, showing the toe-calk represented by Fig. 4 secured in position thereupon. Fig. 6 is a sectional view of a horseshoe, showing a modified construction; and Fig. 7 is a detail plan view of a portion of the horseshoe represented in Fig. 6.

In order to enable those skilled in the art to make and use my invention, I will now describe the same in detail, referring to the drawings, wherein—

The numeral 1 indicates a horseshoe having its heel-pieces 2 formed with bearing-surfaces 3, which incline in a downward direction from the rear extremity of the heel-pieces toward the toe of the horseshoe.

The heel-calks 4 are provided with sole-pieces 5, having bearing-surfaces 6, which incline in a direction corresponding to the inclined bearings 3 of the heel-pieces 2. The heel-calks are each formed with a dowel 7, engaging a suitable recess or cavity 8 in the heel-piece 2, and in advance of such dowel the heel-cork is formed with a screw-hole for the passage of a screw 9, by which to rigidly attach the heel-calk to the horseshoe, while permitting such calk to be detached, if such be desirable.

The toe portion 10 of the horseshoe is formed at its inner edge with a rearwardly-projecting tongue-piece 12, having its lower surface 13 inclined upwardly in a direction from the toe-piece toward the heel-pieces of the horseshoe. This construction is produced by recessing the shoe, which thereby provides two oppositely-arranged offsets or shoulders 14.

The toe-piece 10 is provided with a pair of dowel-holes 15 and a screw-hole 16, and the tongue-piece 12 is provided with a screw-hole 17 for attaching the toe-calk, as hereinafter explained. The toe-calk 18 is formed with a sole-piece 19, from the rear extremity of which extends an obliquely-arranged flange 20, corresponding in angle of inclination to the inclined surface 13 of the tongue-piece 12, and provided with a screw-hole 21 for the passage of a screw 22. The sole-piece 19 is provided with a screw-hole 23 for the passage of a screw 24, and with dowels 25 for entering the dowel-holes 15 in the toe-piece 10 of the horseshoe.

In applying the toe-calk, the dowels 25 are inserted into the dowel-holes 15, so that the sole-piece and the oblique or inclined flange 20 come to rest upon the toe-piece 10 and the inclined surface 13 of the tongue-piece 12, after which the screws 22 and 24 are introduced and tightened up for the purpose of rigidly clamping the toe-calk in position upon the horseshoe.

In the modified construction, Figs. 4 and 5, the sole-piece 19 of the toe-calk 18 is formed with a single dowel 26, which is in the form of a rectangular rib having front and rear inclined surfaces adapted to front and rear inclined surfaces of the dowel-opening 27, Fig. 5.

In attaching the toe-calk, Fig. 4, the dowel 26 is inserted into the dowel-hole 27, and the screw 22 is passed through the screw-hole 21 into engagement with the tongue-piece 12 for the purpose of clamping the toe-calk 18 tightly upon its seat, after which the supplemental screw 24 is applied for the purpose of more firmly attaching the calk. In this construction the dowel 26 has a substantial interlocking engagement with the shoe, and the parts are so firmly united as to entirely avoid accidental displacement of the toe-calk.

In the modified construction, Figs. 6 and 7, the toe-piece 10 of the shoe is formed with a rectangular recess or cavity 28, forming offsets or shoulders 29, and receiving a rectilinear projection 30 on the upper side of the toe-calk 18, and the latter is firmly secured in position by the screws 22 and 24, as heretofore explained.

The inclined surfaces of the tongue-piece 12 on the shoe and the flange 20 on the toe-calk oppose each other when the animal is pulling, and in a similar manner the inclined bearings 3 of the heel-pieces 2 and the inclined bearings 6 of the heel-calks 4 oppose each other, so that the strain incident to pulling tends to more tightly seat the toe and heel calks. This is a very desirable feature and renders the shoe efficient in use.

The improved construction renders the toe and heel calks susceptible of being rapidly and conveniently attached and detached, while the connection of the toe-calk with the shoe is strong, substantial, and durable, so that all liability of the toe-calk becoming accidentally disconnected by lateral or twisting strains is entirely avoided.

Having thus described my invention, what I claim is—

1. The combination of a horseshoe having its toe portion formed with an inclined rearwardly-extending tongue-piece and recessed to provide oppositely-arranged offsets or shoulders, with a toe-calk resting in the recess bearing at opposite sides against the offsets or shoulders and having an inclined flange bearing against the inclined tongue-piece, and means for securing the toe-calk to the toe portion of the shoe and connecting the flange with the tongue-piece, substantially as described.

2. The combination of a horseshoe having its toe portion formed with an inclined rearwardly-extending tongue-piece, with a toe-calk formed with an inclined flange bearing against the inclined tongue-piece, and means for connecting the tongue-piece and flange, substantially as described.

3. The combination of a horseshoe having a rearwardly-extending tongue-piece provided with an inclined lower surface, with a toe-calk having a dowel connection with the shoe and provided with an oblique or inclined flange bearing against the inclined surface of the tongue-piece, and means for connecting the flange to the tongue-piece, substantially as described.

4. The combination of a horseshoe having the rearwardly-projecting tongue-piece and the oppositely-arranged offsets or shoulders, with a toe-calk resting against the offsets or shoulders and having an oblique or inclined flange bearing against the under side of the tongue-piece, a screw connecting the toe-calk with the toe portion of the shoe, and a screw connecting the oblique or inclined flange with the tongue-piece, substantially as described.

5. The combination of a horseshoe having its heel portions formed with bearing-surfaces 3, which incline in a downward direction from the rear extremity of the heel portions toward the toe portion, with heel-calks 4, provided with dowels 7, and sole-pieces 5, which incline in a direction corresponding to the incline bearing-surfaces of the heel portions of the shoe, and screws 9 for rigidly attaching the heel-calks, substantially as described.

In testimony whereof I have hereunto set my hand and affixed my seal in presence of two subscribing witnesses.

J. B. STONER. [L. S.]

Witnesses:
JAMES A. RUTHERFORD,
CHAS. B. TILDEN.